(12) United States Patent
Masini et al.

(10) Patent No.: US 6,806,219 B2
(45) Date of Patent: Oct. 19, 2004

(54) EXCHANGED ZEOLITES X, IN PARTICULAR EXCHANGED WITH LITHIUM, THEIR PROCESS OF PREPARATION AND THEIR USE AS ADSORBENTS OF NITROGEN IN THE SEPARATION OF THE GASES OF THE AIR

(75) Inventors: Jean-Jacques Masini, La Celle Saint-Cloud (FR); Dominique Plee, Lons (FR)

(73) Assignee: Ceca, S.A., Puteaux (FR)

( * ) Notice: Subject to any disclaimer, the term of this patent is extended or adjusted under 35 U.S.C. 154(b) by 261 days.

(21) Appl. No.: 09/752,560

(22) Filed: Jan. 3, 2001

(65) Prior Publication Data

US 2001/0021368 A1 Sep. 13, 2001

(30) Foreign Application Priority Data

Jan. 4, 2000 (FR) .......................................... 00 00039

(51) Int. Cl.$^7$ ........................ B01D 53/047; C01B 39/22
(52) U.S. Cl. .............................. 502/79; 502/85; 502/86; 423/700; 423/DIG. 21; 95/95; 95/130; 95/902
(58) Field of Search ................... 423/700, DIG. 21; 502/79, 85, 86; 95/95, 130, 902

(56) References Cited

U.S. PATENT DOCUMENTS

| 2,882,244 A | | 4/1959 | Milton | |
| 3,119,660 A | | 1/1964 | Howell et al. | |
| 3,140,933 A | | 7/1964 | McKee | |
| 3,906,076 A | | 9/1975 | Goytisolo et al. | |
| 4,603,040 A | | 7/1986 | Kuznicki et al. | |
| 4,859,217 A | | 8/1989 | Chao | |
| 5,152,813 A | * | 10/1992 | Coe et al. ........................ | 95/103 |
| 5,179,979 A | | 1/1993 | Zollinger | |
| 5,258,058 A | * | 11/1993 | Coe et al. ........................ | 95/96 |
| 5,417,957 A | | 5/1995 | Coe et al. | |
| 5,419,891 A | | 5/1995 | Coe et al. | |
| 5,464,467 A | | 11/1995 | Fitch et al. | |
| 5,932,509 A | | 8/1999 | Balse et al. | |
| 5,993,773 A | | 11/1999 | Funakoshi et al. ........... | 423/709 |
| 6,036,939 A | | 3/2000 | Funakoshi et al. ........... | 423/710 |
| 6,264,881 B1 | | 7/2001 | Plee ............................ | 264/628 |
| 6,274,528 B1 | | 8/2001 | Labasque et al. .............. | 502/79 |
| 6,407,025 B1 | * | 6/2002 | Brandt et al. .................. | 502/65 |

FOREIGN PATENT DOCUMENTS

| DE | 24 46 974 | | 4/1975 |
| EP | 196043 | | 10/1986 |
| EP | 0 421 875 | | 4/1990 |
| EP | 0 932 581 | | 10/1990 |
| EP | 0 421 875 | | 4/1991 |
| EP | 0 667 183 | | 8/1995 |
| EP | 0 850 877 | | 7/1998 |
| EP | 863 109 A | * | 9/1998 |
| EP | 0 863 109 | | 9/1998 |
| EP | 0 982 269 | | 3/2000 |
| FR | 2 166 094 | | 8/1973 |
| GB | 1 382 450 | | 1/1975 |
| JP | 4-198011 | | 7/1992 |
| JP | 5-163015 | | 6/1993 |
| JP | 6-183725 | | 7/1994 |
| JP | 10-113554 | | 5/1998 |
| WO | WO 99/05063 | | 2/1999 |

OTHER PUBLICATIONS

Zeolite Molecular Sieves, D.W. Breck, John Wiley and Sons, Aug. 1979, pp. 1–28.
French Search Report for corresponding French application No. FR 00 08906.

* cited by examiner

*Primary Examiner*—David Sample
(74) *Attorney, Agent, or Firm*—Smith, Gambrell & Russell, LLP

(57) ABSTRACT

The present invention relates to zeolites X, most of the exchangeable sites of which are occupied by lithium and di- and/or trivalent cations, having an improved thermal stability and an improved crystallinity with respect to zeolites of the prior art with the same degree of exchange of lithium and of di- and/or trivalent cations. The zeolites of the present invention are particularly effective as adsorbents of the nitrogen present in various gas mixtures and are well suited to the noncryogenic separation of the gases of the air.

20 Claims, No Drawings

EXCHANGED ZEOLITES X, IN PARTICULAR EXCHANGED WITH LITHIUM, THEIR PROCESS OF PREPARATION AND THEIR USE AS ADSORBENTS OF NITROGEN IN THE SEPARATION OF THE GASES OF THE AIR

FIELD OF THE INVENTION

The invention relates to zeolites of X type, to their preparation and to their use in the separation of gas mixtures and more particularly to zeolites of type exchanged with lithium and with trivalent and/or divalent ions which are selective for nitrogen and which have an improved thermal stability and an improved crystallinity, to their preparation and to their use in the separation of nitrogen from less strongly adsorbed gases.

BACKGROUND OF THE INVENTION

The separation of nitrogen from other gases, such as, for example, oxygen, argon and hydrogen, is of considerable industrial importance. When the separation is carried out on a large scale, fractional distillation is often used. However, distillation is very expensive because of the high initial costs for the plant and of the considerable energy demand which it involves. Other separation methods have recently been studied in efforts to reduce the overall cost of these separations.

An alternative to distillation which has thus been used to separate nitrogen from other gases is adsorption. For example, a sodium zeolite X, disclosed in U.S. Pat. No. 2,882,244, has been used with a degree of success for the separation by adsorption of nitrogen from oxygen. One disadvantage of the use of sodium zeolite X for the separation of nitrogen from oxygen is that it only has a low separating efficiency in the separation of nitrogen.

According to U.S. Pat. No. 3,140,933, an improvement in the adsorption of nitrogen is obtained when some of the base ions are replaced by lithium ions. This patent states that the zeolite of X type having base ions replaced by lithium ions can be efficiently used to separate nitrogen from oxygen at temperatures ranging up to 30° C. Because the exchange of ions is not total and because the zeolites X have been synthesised in a sodium medium, the adsorbent used is a mixed sodium/lithium zeolite.

U.S. Pat. No. 4,859,217 discloses that very good separation of nitrogen from oxygen can be obtained by absorption at temperatures of 15 to 70° C. using a zeolite of X type which has more than 88% of its ions in the form of lithium ions, in particular when a zeolite is used with a silicon/aluminium atomic ratio of between 1 and 1.25.

Unfortunately, the zeolite of X type highly exchanged with lithium has a very strong affinity for water and the presence of adsorbed water, even small amounts, seriously reduces the adsorption capacity of the zeolite. Consequently, in order to ensure optimum performance as regards adsorption, it is necessary to activate the zeolite by heating it to temperatures ranging up to 600 to 700° C. in order to drive off as much adsorbed water as possible. Because the zeolites of X type exchanged with lithium are not stable at temperatures greater than approximately 740° C., the activation of these adsorbents must be carefully controlled in order to prevent them from being damaged. Another disadvantage of zeolites of X type highly exchanged with lithium stems from the fact that they have a high production cost due to the price of the lithium compounds needed in their manufacture.

A need thus exists for adsorbents which have good thermal stability, good crystallinity and adsorbent properties for nitrogen at least equal to those of zeolites highly exchanged with lithium but which can be produced at more reasonable costs.

U.S. Pat. No. 5,179,979 maintains that lithium/alkaline earth metal zeolites of X type having lithium/alkaline earth metal molar ratios of the order of 95/5 to 50/50 approximately have a higher thermal stability than that of the corresponding zeolites with pure lithium and good adsorption selectivities and capacities.

U.S. Pat. No. 5,152,813 discloses the adsorption of nitrogen from gas mixtures which uses crystalline zeolites X having an Si/Al zeolite ratio $\leq 1.5$ in which the exchangeable sites are occupied by at least 2 ions: between 5 and 95% of lithium ion and between 5 and 95% of a second ion chosen from calcium, strontium and mixtures of these, the total (lithium and second exchangeable ion) being at least 60%.

U.S. Pat. No. 5,464,467 or EP 667 183 provide a zeolite of X type, the cations of which comprise, referred to as equivalents, from approximately 50 to approximately 95% of lithium, from approximately 4 to approximately 50% of trivalent ions chosen from aluminium, scandium, gallium, iron(III), chromium(III), indium, yttrium, lanthanides alone, mixtures of two lanthanides or more, and mixtures of these, and from 0 to approximately 15% of residual ions chosen from sodium, potassium, ammonium, hydronium, calcium, strontium, magnesium, barium, zinc, copper(II) and mixtures of these, which is prepared by exchange of the exchangeable cations of the zeolite, preagglomerated with a binder, first with lithium and then with the trivalent cation or cations.

U.S. Pat. No. 5,932,509 provides for the preparation of these same zeolites according to a process which consists first in exchanging the exchangeable cations of the powdered zeolite X with trivalent cations, in then agglomerating with a binder and finally in carrying out the lithium exchange on the agglomerated zeolite.

DETAILED DESCRIPTION OF THE INVENTION

The Applicants have found that the zeolites prepared according to the teaching of U.S. Pat. Nos. 5,179,979, 5,152,813, 5,464,467 or 5,932,509, although exhibiting good thermal stability and a good nitrogen adsorption capacity, have an insufficient crystallinity and exhibit a degree of heterogeneity in the distribution of the tri- and/or divalent cations.

The present invention provides zeolites of X type having an Si/Al atomic ratio of less than 1.5 and preferably of between 0.9 and 1.1, the exchangeable cations of which comprise, referred to as equivalents, from approximately 50 to approximately 95% of lithium ions, from approximately 4 to approximately 50% of trivalent ions chosen from aluminium, scandium, gallium, iron (III), chromium(III), indium, yttrium, lanthanides or rare earth metals, alone or as a mixture, and/or of divalent ions chosen from calcium, strontium, zinc, copper, chromium(II), iron(II), manganese, nickel or cobalt, alone or as a mixture, 0 to approximately 15% of residual ions chosen from sodium, potassium, ammonium or hydronium, alone or as a mixture, Which are capable of being obtained according to a process which comprises the following stages:

a) suspension of the zeolite in water, then b) exchange of the exchangeable cations of the suspended zeolite with one or more di- and/or trivalent ions by simultaneous and/or successive contact(s) in a rapid mixer of the said suspension with one or more solutions comprising compounds of the di- and/or trivalent ions, c) exchange of the exchangeable cations of the zeolite resulting from stage b) with lithium, which stages will be explained in detail below.

The zeolites of the present invention can be provided in various forms and the exact form which they assume can determine their usefulness in the industrial adsorption processes. When the zeolites of the present invention are used in industrial adsorbers, it may be preferred to agglomerate (for example, to convert into granules) the zeolite in order not to risk compacting the pulverulent zeolite in an adsorption column of industrial size, thus blocking or at the very least greatly reducing the flow through the column. These techniques generally involved mixing the zeolite with a binder, which is usually a clay, converting the mixture to an agglomerate, for example by extrusion or bead formation, and heating the zeolite/binder mixture formed to a temperature of 600–700° C. approximately in order to convert the "green" agglomerate to an agglomerate which is resistant to crushing. The binders used to agglomerate the zeolites can include clays, silicas, aluminas, metal oxides and their mixtures.

It is possible to prepare agglomerates comprising less than 10%, indeed even less than 5%, by weight of residual binder. A process for producing these agglomerates with a low level of binder consists in converting the binder of the agglomerates described above to the zeolite phase. For this, the starting point is the agglomeration of a zeolite LSX powder with a binder which can be converted to zeolite (for example kaolin or metakaolin), then conversion to zeolite is carried out by alkaline maceration, for example according to the process disclosed in EP 932 581, and then the granule which has been converted to zeolite is exchanged with sodium. It is thus possible to easily obtain according to the invention outstandingly effective agglomerates assaying at least 90%, indeed even at least 95%, of zeolite LSX.

In addition, the zeolites can be agglomerated with materials such as silica/alumina, silica/magnesia, silica/zirconia, silica/thoria, silica/beryllium oxide and silica/titanium dioxide, as well as with ternary compositions, such as silica/alumina/thoria, silica/alumina/zirconia and clays present as binders. The relative proportions of the materials and of the zeolites mentioned above can vary widely. When the zeolite has been converted to agglomerates before use, these agglomerates advantageously have a diameter of approximately 0.5 to approximately 5 mm.

The agglomeration binder generally represents from 5 to 30 parts by weight per 100 parts of agglomerate.

A second subject-matter of the invention relates to a process for the preparation of the zeolites defined above.

The zeolites of the invention are generally prepared from a base zeolite of X type which usually originally has sodium and/or potassium ions as charge-compensating cations, that is to say ions which compensate for the negative charge of the aluminosilicate lattice.

The exchangeable cations of the starting zeolite are exchanged with a solution of the compounds of the trivalent ions and/or of the divalent ions (stage b)) by simultaneously pumping the suspension of zeolite to be exchanged, suspended beforehand in water (stage a)), and the solution of the compounds by forcing them to pass through a rapid mixer capable of providing homogeneous mixing of the suspension and of the solution after a short time of contact between the suspension and the solution (a few minutes), which mixer is preferably a static mixer capable of providing homogeneous mixing after a very short contact time (a few seconds), all arrangements being made in order for the flow rates to be adjusted so as to retain a weight of suspension/weight of solution ratio which is virtually constant. Recourse to exchange in a static mixture has no effect with regard to the degree of exchange, which remains the quantitative degree achieved by conventional exchange. A better random distribution of the di- and/or trivalent ions within the zeolite structure is obtained, which is reflected by a final level for the nitrogen adsorption capacity which is significantly improved, which is entirely unexpected.

It is preferable, although this is not absolutely essential, to use aqueous solutions of the exchange ions. Any water-soluble compound of the exchanging ions can be used. The preferred water-soluble compounds of the ions are the salts and in particular the chlorides, the sulfates and the nitrates. The particularly preferred salts are the chlorides, because of their high solubilities and their ready availability.

When it is desired to prepare a zeolite according to the invention, a portion of the cationic sites of which are occupied by several types of divalent and/or trivalent ions defined above, it is possible either to simultaneously exchange all the cations, by contact with a solution comprising all these cations, or to carry out a successive exchange of each cation, or to use a solution intermediate between the 2 above solutions.

A preferred alternative for the invention consists in exchanging the exchangeable cation or cations with tri- and/or divalent ions and with monovalent ions, preferably the sodium ion.

Another preferred alternative form consists in stabilizing, with sodium hydroxide, the zeolite immediately after the exchange with tri- and/or divalent ions or else after the exchange with tri- and/or divalent ions and monovalent ions.

When the zeolites according to the invention are provided in agglomerated form, a particularly preferred form, the agglomerated stage is carried out after the exchange of a portion of the exchangeable cations of the zeolite with tri- and/or divalent cations, optionally in the presence of a monovalent cation.

It proves to be particularly advantageous to convert all the exchangeable cations of the starting zeolite to a single monovalent cationic species, preferably the sodium or ammonium ion form, prior to the exchange with the di- and/or trivalent cations as explained in detail above. For this, the zeolite is brought into contact with a solution comprising monovalent ions, such as sodium or ammonium, for example an aqueous NaCl or $NH_4Cl$ solution.

Once exchanged with di- and/or trivalent ions, the zeolite can also be advantageously brought into contact, before or after the optional agglomeration stage, with a solution comprising sodium or ammonium ions, for example an aqueous NaCl or $NH_4Cl$ solution.

The following stage of the process according to the invention (stage c)) consists in exchanging a portion of the exchangeable cations with lithium ions by contact with a lithium compound solution, preferably an aqueous solution of lithium salt, such as LiCl. In a way known to a person skilled in the art, the zeolite, after each ion exchange stage, is washed with water and then dried at a temperature generally of between 40 and 200° C.

Preferably, at atmospheric pressure, the temperature of the solution of lithium compounds is between 80 and 115° C. and in particular between 95 and 115° C. Higher temperatures can be used, with pressurization of the system.

The concentration of lithium in the solution, limited by the solubility of the salts, is chosen to be as high as possible in order to reduce the cost related to reprocessing.

A particularly advantageous alternative form consists in carrying out the operation countercurrent-wise and continuously according to the procedure of EP 863 109 explained in detail below:

The zeolite is distributed in at least 2, preferably at least 3, receptacles in the stationary bed form which are arranged in series in an interchangeable manner, the solution of lithium compounds is conveyed through the said receptacles arranged in series and the sequence of the receptacles arranged in series, known as a "carousel", is modified cyclically at given time intervals, the inlet of the fresh solution being moved on each occasion from the 1st receptacle, in which is found the zeolite which has been exchanged with lithium to the greatest extent, to the following receptacle in the series; when the desired degree of exchange of lithium is reached for the zeolite in the 1st receptacle, the latter is taken out of the series of receptacles of the carousel and the zeolite which is present therein is freed from the solution of lithium compounds by washing, then discharged and optionally replaced by a fresh charge of zeolite to be exchanged.

The cycle time of a time interval typically amounts to at least 15 minutes and preferably to at least 1 hour.

According to a third subject-matter of the invention, the zeolites according to the invention are used as adsorbent of the nitrogen present in a gas mixture and in particular air, thus making it possible to separate the nitrogen from the other gases present in the gas mixture. The separation is carried out by passing the gas mixture into at least one adsorption region comprising the adsorbent according to the invention.

In a preferred embodiment, the adsorption process is cyclic and comprises the adsorption stage described above and a stage of desorption of the nitrogen from the adsorption region(s).

The preferred cyclic processes encompass adsorption by pressure variation (PSA for Pressure Swing Adsorption or VSA for Vacuum Swing Adsorption (specific case of desorption under vacuum)), by temperature variation (TSA for Temperature Swing Adsorption) and combinations of these (PTSA).

According to some preferred embodiments, the adsorption stage is carried out at a temperature of between approximately −20 and approximately 50° C. and at an absolute pressure of between approximately 0.08 and 1 MPa.

In a highly preferred embodiment of the invention, the adsorption process is used to separate the nitrogen from a gas mixture comprising nitrogen and one or more other gases chosen from oxygen, argon, helium, neon and hydrogen.

In other preferred embodiments of the invention, the stage of regeneration of the adsorption zone is carried out by vacuum means (suction), by purging the adsorption zone with one or more inert gas(es) and/or with a part of the gas mixture coming out the adsorption zone, by temperature variation or by combination of these regenerations by suction, by purging and/or temperature variation; in general, the repressurization of the bed is at least partially carried out by using the nonadsorbed gas from the adsorption system.

The temperature at which the adsorption stage of the adsorption process is carried out depends on a number of factors, such as the specific gases to be separated, the specific adsorbent used and the pressure at which the adsorption is carried out. In general, the adsorption stage is carried out at a temperature of at least approximately −20° C. and advantageously at a temperature of at least approximately 15° C. The adsorption is generally carried out at temperatures which are not greater than approximately 70° C. and preferably at temperatures which are not greater than 50° C. and more preferably still at temperatures which do not exceed approximately 35° C.

The adsorption stage of the adsorption process according to the invention can be carried out at any of the usual and well known pressures used in adsorption processes of TSA, PSA or VSA type. Typically, the minimum absolute pressure at which the adsorption stage is carried out is generally at least equal to atmospheric pressure. The maximum absolute pressure at which the adsorption stage is carried out generally does not exceed approximately 1.5 MPa and preferably approximately 1 MPa and advantageously approximately 0.4 MPa.

When the adsorption process is adsorption by pressure variation, the adsorbent is generally regenerated at a pressure of between 10 and 500 kPa, preferably from 20 to 200 kPa approximately, lower than the adsorption pressure and, when it is adsorption by temperature variation, it is generally regenerated at a temperature of between 0 and 300° C. approximately, greater than the adsorption temperature.

When the adsorption process is of TSA type, the temperature of the bed(s) is thus increased during the regeneration stage with respect to the adsorption temperature. The regeneration temperature can be any temperature below that at which the adsorbent begins to decompose. Generally, the temperature of the adsorbent is usually increased to a value of between approximately 0 and approximately 300° C. and preferably between approximately 25 and 250° C. and advantageously between approximately 50 and 180° C. The regeneration procedure can be a combination of PSA or VSA and of TSA, in which case both the temperature and the pressure used during the regeneration will vary within the ranges indicated above.

EXAMPLES

The examples which follow will give a better understanding of the invention. Tables 1–5 give various comparative results obtained in the Examples.

Example 1 (Comparative According to EP 667 183 (BOC))

1,000 liters of softened industrial water are introduced into a vessel equipped with a propeller stirrer. 200 kg of powdered zeolite LSX (amount considered as anhydrous product), with an Si/Al atomic ratio equal to 1, the exchangeable cationic sites of which are 77% occupied by sodium and 23% occupied by potassium, with a micropore volume equal to 0.262 cm$^3$/g (measured by toluene adsorption at 25° C. under a relative pressure of 0.5) and with a Dubinin volume equal to 0.325 cm$^3$/g, are added with stirring (100 rev/min and peripheral speed=3.5 m/s). 45 kg of solution of industrial rare earth metal chlorides, which solution is sold by Rhodia under the name LADI (aqueous solution comprising lanthanum and praseodymium chlorides at concentrations, expressed as $La_2O_3$ and $Pr_2O_3$, of 16.6 and 7.2% by weight respectively, the remainder being predominantly composed of water and of traces of chlorides of other rare earth metals (Ce, Nd)), are subsequently introduced over approximately 10 minutes. The stirring is decreased to 20 rev/min and the reactor is maintained under these conditions for approximately 1 hour, at the end of which time it is found that the mixture is finally homogeneous, after which the powder thus obtained is filtered off, washed and dried.

The powder is subsequently agglomerated using a clayey binder at the level of 17% by weight (considered with respect to the agglomerate). The product is shaped in the form of beads with a diameter of 1.6–2.5 mm. These beads are dried at 80° C. and then activated according to the LTC (traversed bed) technology, for example disclosed in EP 421 875, at 580° C. under dry air devoid of carbon dioxide.

Exchange with lithium is then carried out, which consists in subjecting the above beads to the action of a 4M aqueous lithium chloride solution at 110° C., the solution/mass of the beads ratio by volume being 10. This exchange is carried out 6 times, which ensures the virtually complete removal of the sodium and potassium ions initially present in the structure of the zeolite LSX. The resulting product is dried at 60° C.

and then activated according to the LTC technology at a temperature of 580° C. under dry air devoid of carbon dioxide.

The analysis of the ions of the product, expressed as percentage of the initial zeolite LSX exchange capacity, is thus:

| | |
|---|---|
| rare earth metal equivalents | 14% |
| sodium + potassium equivalents | 1% |
| lithium equivalents | 85% |

Example 2

1,000 liters of softened industrial water are introduced into a vessel equipped with a propeller stirrer. 200 kg of powdered zeolite LSX, the characteristics of which are shown in Example 1, are added with stirring (100 rev/min and peripheral speed=3.5 m/s). 45 kg of LADI solution of industrial rare earth metal chlorides are measured into a second vessel.

The suspension of zeolite LSX and the solution of rare earth metal chlorides are then simultaneously pumped while forcing them to pass through the same static mixer. The flow rates are adjusted so as to continually retain a weight of suspension/weight of solution ratio equal to 1,200/45. The mixture exiting from the static mixer is stored in a third vessel with gentle stirring for one hour, after which the solid is filtered off, washed and dried.

This solid is subjected to the same agglomeration, intermediate activation, lithium exchange and final activation actions as in Example 1. The analysis of the ions in the exchanged structure leads to the same results as in Example 1.

Example 3

The adsorbents based on rare earth metal/lithium zeolite prepared in Examples 1 and 2 are tested with regard to their nitrogen adsorption capacities ($C_{N_2}$) at 25° C. and under a pressure of 100 kPa, after conditioning by degassing under a vacuum of $10^{-3}$ mm of mercury at 300° C. for 3 hours. The Dubinin volume of these adsorbents is also measured.

The following results are obtained:

TABLE 1

| Type of adsorbent | $C_{N_2}$ at 100 kPa at 25° C. (cm$^3$/g) | Dubinin volume |
|---|---|---|
| According to Example 1 (comparative) | 20.5 | 0.28 |
| According to Example 2 | 21.2 | 0.29 |

It is deduced from these results that the adsorbent according to the invention prepared in Example 2 has a better nitrogen adsorption potential than the adsorbent prepared in Example 1 according to the teaching of EP 667 183 as it exhibits a more homogeneous distribution of the load of rare earth metals which is reflected in the adsorption properties of the final product.

The following Examples 4 to 7 were carried out on the laboratory scale by introducing the solution of rare earth metal chlorides dropwise into the zeolite suspension: this corresponds to an immediate dispersion as obtained on the industrial scale with a static mixer.

Example 4

20 g of powdered zeolite LSX as defined in Example 1 are introduced into 200 g of water with stirring. After homogenizing the suspension, 34.5 g of solution of rare earth metal chlorides diluted in water, composed of 30 ml of water and of 4.5 g of LADI solution of rare earth metal chlorides, are added dropwise over 20 minutes. After complete addition, stirring is halted and the reaction mixture is maintained at room temperature for 2 hours, then filtration is carried out and the cake thus obtained is washed and dried at room temperature; this method is known as route 1.

According to a second method, known as route 2, the 30 ml of water of the solution of rare earth metal chlorides diluted in the above water are replaced with 30 ml of a 2M aqueous NaCl solution, which results in an overall concentration of Na in the reaction mixture of the order of 0.35M. A competitive exchange is carried out here between the rare earth metal cations and the sodium cations present.

The zeolite powders obtained by routes 1 and 2 are chemically analysed, both by conventional chemical analysis and by XPS spectroscopy (X-ray photoelectron spectroscopy), which allows the surface of the sample to be affected only over a thickness of the order of a few tens of Å; it is thus possible to ascertain whether the surface is similar to the overall composition.

The results are as follows:

TABLE 2

| | | Route 1 | Route 2 |
|---|---|---|---|
| Overall chemical analysis | Degree of rare earth metal exchange (%) | 14.8 | 13.2 |
| | Degree of Na exchange (%) | 58.6 | 68.6 |
| | Degree of K exchange (%) | 19.8 | 14.9 |
| | Cationic compensation (%) | 93 | 97 |
| Chemical analysis by XPS | Degree of rare earth metal exchange (%) | 86 | 59 |

The inventors believe that the 100% cationic closure is provided by protons; this would imply that route 1 provides a product which is slightly more acidic than that of route 2.

In the light of these results, it is concluded that the competitive exchange with NaCl (route 2) makes it possible:

to improve the homogeneity in distribution of the ions in the zeolite to reduce the residual potassium content to improve the cationic compensation.

The inventors believe that all these elements militate in favour of an improvement in the quality of the powder for the purpose of subsequent shaping and subsequent exchange.

Example 5

20 grams (considered as anhydrous equivalents) of powdered LSX as defined in Example 1 are dispersed in 118 ml of water with gentle stirring. 115 ml of an aqueous solution also comprising 5 g of LADI solution of rare earth metal chlorides and 37 g of NaCl are added to this suspension, which results in an overall concentration of sodium of 2.7M. A competitive exchange is thus carried out here between the rare earth metals and the sodium. After complete addition of the solution, stirring is halted and the reaction mixture is maintained at room temperature for 2 hours, then filtration is carried out and the cake thus obtained is washed and dried at room temperature.

The zeolite powder obtained is chemically analysed, both by conventional chemical analysis and by XPS spectroscopy; the results are as follows:

TABLE 3

| Overall chemical analysis | Degree of rare earth metal exchange (%) | 16 |
|---|---|---|
| | Degree of K exchange (%) | 4.5 |
| | Degree of Na exchange (%) | 79.5 |
| | Cationic compensation (%) | 100 |
| Chemical analysis by XPS | Degree of rare earth metal exchange (%) | 47.5 |

These values thus clearly show, just like those in Example 4, that success is achieved in providing a better distribution of the rare earth metals by the rare earth metals/sodium competitive exchange. At the same time, the cationic compensation shows that no protons are retained. Finally, the degree of exchange of potassium decreases to low levels.

This powder is subsequently agglomerated using the same clay binder as that in Example 1, the powder being shaped into the form of beads with a diameter of 1.6 to 2.5 mm. These beads are dried at 80° C. and then activated according to the LTC technology at 580° C. The lithium exchange, which consists in subjecting the beads to the same treatment as that described in Example 1, is subsequently carried out. The resulting product is dried at 60° C. and then activated according to the LTC technology at 580° C. under dry air devoid of carbon dioxide.

The analysis of the ions in the product, expressed as a percentage of the initial zeolite LSX exchange capacity, is thus:

| rare earth metal equivalent | 16% |
|---|---|
| sodium and potassium equivalent | 1% |
| lithium equivalent | 83% |

The adsorbent in question is tested with regard to its nitrogen adsorption capacity at 25° C. and under a pressure of 100 kPa, after degassing at 300° C. under a vacuum of 0.13 Pa for 3 hours. The following results are obtained:

$C_{N_2}$ at 100 kPa at 25° C. 22.1 cm$^3$/g

The Dubinin volume is measured by making use of the $N_2$ adsorption isotherm at 77° K, measured on the degassed samples; a Dubinin volume of 0.290 cm$^3$/g is obtained.

These results thus clearly confirm that the adsorbents prepared according to the preferred process of the invention (competitive di- or trivalent cation/monovalent cation exchange) exhibit a greater nitrogen adsorption capacity than that of those for which the rare earth metal exchange did not take place in the presence of sodium ion.

Example 6

An exchange of a portion of the exchangeable Na$^+$ and K$^+$ cations of the zeolite LSX defined in Example 1 with rare earth metal cations is carried out by mixing a suspension of 10 g of zeolite and of 70 g of water with 2.33 g of a LADI solution of rare earth metal chlorides at room temperature for 2 hours, in order to achieve a degree of exchange of 15% according to the process described in Example 1. After 1 h 45 of contact between the aqueous zeolite suspension and the rare earth metal chloride solution, a small amount of sodium hydroxide (in a proportion of 0 g, 0.6 g and 2 g respectively of sodium hydroxide per kg of exchanged zeolite powder) is added to the reaction medium in order to compensate for the protons and the mixture is kept stirred for 15 minutes. The suspension is filtered and the zeolite is washed with approximately 15 ml of water per gram of zeolite. Chemical analysis of the powder not stabilized with sodium hydroxide at the end of the exchange shows that approximately 7% of the cationic sites are occupied by protons, which is not surprising in so far as the exchange was carried out using a slightly acidic solution.

A few grams of exchanged and optionally stabilized zeolite powder are subsequently dried in a ventilated oven for 1 h at 80° C. and then activated at 550° C. for 1 hour in the same type of ventilated oven. Their micropore volume is subsequently measured by absorption of toluene under a relative pressure of 0.5 at 25° C. The results are combined in the table below:

TABLE 4

| Amount of sodium hydroxide added per kg of exchanged zeolite | 0 g | 0.6 g | 2 g |
|---|---|---|---|
| Micropore volume (cm$^3$/g) | 0.228 | 0.237 | 0.25 |

It is seen that the stabilization with sodium hydroxide results in a greater micropore volume and confers better thermal resistance (better resistance to calcination) on the zeolite.

Example 7

An exchange of a portion of the exchangeable Na$^+$ and K$^+$ cations of the zeolite LSX defined in Example 1 with Zn$^{2+}$ cations is carried out by mixing 1,200 g of an aqueous suspension comprising 200 g of zeolite with 90 ml of an aqueous ZnCl$_2$ solution, the zinc concentration of which is 0.1M, at 80° C. for 3 hours; the pH of the reaction mixture being equal to 7.

In an alternative form of the process, stabilization with sodium hydroxide is carried out at the end of exchange by addition of a concentrated sodium hydroxide solution in a proportion of 22.5 g of sodium hydroxide added per kg of Zn-exchanged zeolite.

The subsequent washing, drying and activation operations are carried out under similar conditions to those described in the preceding examples. The micropore volume and the percentage of the cationic sites occupied by protons are then measured; the results are combined in the table below:

TABLE 5

| Amount of soditun hydroxide added per kg of exchanged zeolite (g) | 22.5 | 0 |
|---|---|---|
| Degree of exchange of zinc (%) | 14 | 13.7 |
| Micropore volume (cm$^3$/g) | 0.260 | 0.262 |
| Percentage of the cationic sites occupied by protons | 2 | 5 |

It is found that the stabilization treatment with sodium hydroxide had the effect of
- decreasing the number of protons in the solid but the micropore volumes measured are substantially identical
- slightly improving the efficiency of exchange of zinc, which changes from 98% to virtually 100%, which is particularly advantageous in so far as less zinc is discharged.

The powdered zeolite, exchanged with zinc and optionally stabilized with sodium hydroxide, is subsequently agglomerated with a binder (17% of binder in the agglomerate) and then exchanged with lithium under the same conditions as in the preceding examples: bringing into contact at 100° C. of 3.6 g of agglomerated zeolite exchanged with zinc, optionally stabilized with sodium hydroxide, prepared above and 30 ml of a 4M aqueous LiCl solution; after contact, the agglomerates are filtered, washed and dried. It is found that the degree of exchange of zinc of the zeolite which has not been stabilized with sodium hydroxide fell to 8% after the lithium exchange, which means that a good part of the zinc has been released (back exchange) during the exchange with lithium. The release in question is estimated at 1.3 g of zinc per liter of solution at equilibrium.

Unexpectedly, the degree of exchange of zinc of the zeolite which has been stabilized with sodium hydroxide does not vary after the lithium exchange and, in fact, it is found that, at equilibrium, the content of zinc in the aqueous liquors after lithium exchange is very much less than 50 ppm, a sign that release is insignificant.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The foregoing references are hereby incorporated by reference.

What is claimed is:

1. Process for the preparation of zeolite X having a Si/Al atomic ratio of less than 1.5, the exchangeable cations of which comprise, referred to as equivalents, from approximately 50 to approximately 95% of lithium ions, from approximately 4 to approximately 50% of trivalent ions selected from aluminum, scandium, gallium, iron (III), chromium (III), indium, yttrium, lanthanides or rare earth metals, alone or as a mixture, and/or of divalent ions selected from calcium, strontium, zinc, copper, chromium (II), iron (II), manganese, nickel or cobalt, alone or as a mixture, and 0 to approximately 15% of residual ions selected from sodium, potassium, ammonium or hydronium, alone or as a mixture, comprising:
   a) suspension of the zeolite in water, then;
   b) exchange of the exchangeable cations of the suspended zeolite with at least one di- and/or trivalent ion by simultaneous and/or successive contacts(s) in a static mixer of the said suspension with at least one solution comprising compounds of the at least one di- and/or trivalent ion; and
   c) exchange of the exchangeable cations of the zeolite resulting from stage b) with lithium.

2. Preparation process according to claim 1, wherein it comprises, in addition to the stages of the process of claim 1, a stage of agglomeration with a binder of the zeolite resulting from stage b).

3. Process according to claim 1, wherein it comprises, in addition to the stages of the process of claim 1, a stage of exchange of the exchangeable cations of the zeolite resulting from stage a) and/or from stage b) with a monovalent cation.

4. Process according to claim 3, wherein the monovalent cation is an ammonium ion or a sodium ion.

5. Process according to claim 1, wherein the cationic exchange or exchanges of stage b) are carried out in the presence of compound(s) of a monovalent ion.

6. Process according to claim 5, wherein the monovalent cation is an ammonium ion or a sodium ion.

7. A process according to claim 5, further comprising a stage of stabilization with sodium hydroxide immediately after the exchange with monovalent ions of stage b).

8. Process according to claim 1, wherein it comprises a stage of stabilization with sodium hydroxide immediately after the exchange with tri- and/or divalent ions or with tri- and/or divalent ions of stage b).

9. Process according to claim 1, wherein stage c) is carried out countercurrentwise and continuously in receptacles in the stationary bed form which are arranged in series in an interchangeable manner, the solution of lithium compounds being conveyed through said receptacles arranged in series, a sequence of the receptacles arranged in series being modified cyclically at given time intervals, the inlet of the fresh solution being moved on each occasion from a first receptacle, in which is found the zeolite which has been exchanged with lithium to the greatest extent, to the following receptacle in the series; when partial or complete exchange of lithium is reached for the zeolite in the first receptacle, the first receptacle is taken out of the series of receptacles and the zeolite which is present therein is freed from the solution of lithium compounds by washing, then discharged and optionally replaced by a fresh charge of zeolite to be exchanged.

10. Process according to claim 9, wherein the zeolite is distributed in two receptacles.

11. Process according to claim 9, wherein the zeolite is distributed in at least three receptacles.

12. Process according to claim 1, wherein the Si/Al atomic ratio is between 0.9 and 1.1.

13. Zeolite X having a Si/Al atomic ratio of less than 1.5, the exchangeable cations of which comprise, referred to as equivalents, from approximately 50 to approximately 95% of lithium ions, from approximately 4 to approximately 50% of trivalent ions selected from aluminum, scandium, gallium, iron (III), chromium (III), indium, yttrium, lanthanides or rare earth metals, alone or as a mixture, and/or of divalent ions selected from calcium, strontium, zinc, copper, chromium (II), iron (II), manganese, nickel or cobalt, alone or as a mixture, and 0 to approximately 15% of residual ions selected from sodium, potassium, ammonium or hydronium, alone or as a mixture; obtained according to the preparation process of claim 1.

14. A zeolite according to claim 13 having a Si/Al atomic ratio of between 0.9 and 1.1.

15. A zeolite according to claim 13 agglomerated with an inorganic binder which is inert in the sense of adsorption, which zeolite is obtained according to the process of claim 1.

16. A zeolite according to claim 15 agglomerated with a binder selected from clays, silicas, albumins and/or metal oxides.

17. A zeolite according to claim 16, wherein the binder represents from 5 to 30 parts by weight of the agglomerate.

18. Method for separating nitrogen from a gas mixture according to an adsorption process comprising passing said gas mixture into at least one absorption region comprising an adsorbent composed essentially of a zeolite as defined in claim 13.

19. Method for separating nitrogen from a gas mixture according to an adsorption process, in which the adsorption process is cyclic and comprises, in addition to the adsorption stage of passing said gas mixture into at least one adsorption region comprising an adsorbent composed essentially of a zeolite as defined in claim 13, a stage of desorption of the nitrogen from the adsorption region(s) composed essentially of a zeolite as defined in claim 13.

20. Method according to claim 19, wherein the adsorption process is a PSA, VSA and/or TSA process.

* * * * *

UNITED STATES PATENT AND TRADEMARK OFFICE
CERTIFICATE OF CORRECTION

PATENT NO. : 6,806,219 B2
DATED : October 19, 2004
INVENTOR(S) : Jean-Jacques Masini et al.

It is certified that error appears in the above-identified patent and that said Letters Patent is hereby corrected as shown below:

Column 10,
Line 41, in Table 5, replace "soditun" with -- sodium --;

Column 12,
Line 46, replace "albumins" with -- aluminas --;
Line 51, place "absorption" with -- adsorption --.

Signed and Sealed this

Twenty-first Day of June, 2005

JON W. DUDAS
*Director of the United States Patent and Trademark Office*